United States Patent
Herbst et al.

(10) Patent No.: US 6,613,202 B2
(45) Date of Patent: Sep. 2, 2003

(54) TANK BATCH ELECTROCHEMICAL WATER TREATMENT PROCESS

(75) Inventors: Lori B. Herbst, Englewood, CO (US); Robert Herbst, Englewood, CO (US); Keith Wilkerson, Englewood, CO (US)

(73) Assignee: Current Water Technology, Inc., Englewood, CO (US)

(*) Notice: Subject to any disclaimer, the term of this patent is extended or adjusted under 35 U.S.C. 154(b) by 264 days.

(21) Appl. No.: 09/848,092

(22) Filed: May 2, 2001

(65) Prior Publication Data

US 2001/0025784 A1 Oct. 4, 2001

Related U.S. Application Data

(63) Continuation-in-part of application No. 09/329,268, filed on Jun. 28, 1999, now Pat. No. 6,241,861.

(51) Int. Cl.[7] .............................. C25B 9/00; C25B 11/00
(52) U.S. Cl. ..................... 204/270; 204/273; 204/276; 204/277; 204/278; 204/288
(58) Field of Search ................................ 204/240, 270, 204/269, 229.6, 230.2, 276, 278.5, 288–289, 273

(56) References Cited

U.S. PATENT DOCUMENTS

| | | | | |
|---|---|---|---|---|
| 2,864,750 A | * | 12/1958 | Hughes, Jr. et al. | 204/149 |
| 4,036,726 A | * | 7/1977 | Gale et al. | 204/149 |
| 4,101,409 A | * | 7/1978 | Austin | 204/277 |
| 4,179,347 A | * | 12/1979 | Krause | 204/149 |
| 4,908,109 A | * | 3/1990 | Wright | 204/149 |
| 5,611,907 A | * | 3/1997 | Herbst et al. | 205/742 |

* cited by examiner

*Primary Examiner*—Donald R. Valentine
(74) *Attorney, Agent, or Firm*—Edwin H. Crabtree; Ramon L. Pizarro; Donald W. Margolis

(57) ABSTRACT

A water treatment tank for treating waste water using an electrochemical treatment process. The electrochemical process removes both suspended and dissolved solids in the water and allows the treated water to be removed from the tank for reuse or discharge. The tank includes a tank housing with first and second waste water receiving compartments. The two compartments are identical and are used alternately when treating the waste water. A waste water inlet line is attached to the top of the first compartment for filling the compartment with waste water. A side of the first compartment includes an annular opening for receiving an electrode assembly with a plurality of electrodes extending inside the compartment for treating the waste water electrochemically. The electrodes are attached to the power supply via electrode cables with the polarity of a current cycle reversed periodically depending on the types of water contaminates being treated. When the cycle is reversed, the contaminates gather on the electrodes typically fall to the bottom of the tank as sludge and are drained into a removable filter basket. The compartments also include an airline connected to an air spray manifold. The air spray manifold is used for circulating air bubbles upwardly in and around the electrodes for providing a scrubbing effect and carrying away contaminates that might gather on the electrodes.

17 Claims, 2 Drawing Sheets

TANK BATCH ELECTROCHEMICAL WATER TREATMENT PROCESS

This application is a Continuation-In-Part patent application based on an earlier filed application having a title of "TANK BATCH ELECTROCHEMICAL WATER TREATMENT PROCESS" filed on Jun. 28, 1999 and having Ser. No. 09/329,268, now U.S. Pat. No. 6,241,861.

BACKGROUND OF THE INVENTION (a) Field of the Invention

This invention relates to a water treatment tank and process for treating contaminated waste water and more particularly, but not by way of limitation, to a tank and process using an electrochemical treatment of the water for dropping out and stratifying various types of contaminants held in suspension in the waste water.

(b) Discussion of Prior Art

In U.S. Pat. Nos. 4,293,400 and 4,378,276 to Liggett, an apparatus with a positively charged aluminum electrode and a negatively charged tubular steel electrode are disclosed for the electrolytic treatment of water. In U.S. Pat. No. 5,587,057 to Metzler et al., an electrocoagulation process is described having electrolytic treaters for treating a highly conductive liquid.

In U.S. Pat. No. 4,1872,959 to Herbst et al. and U.S. Pat. Nos. 5,043,050 and 5,423,962 to Herbst, one of the inventors of the subject invention, Robert J. Herbst describes different types of improved electrolytic systems for treating aqueous solutions using conductive conduits and precipitating various organic and inorganic materials suspended in the solution.

None of the above mentioned prior art electrolytic treatment systems for treating liquids disclose the subject water treatment tank for treating waste water or teach the electrochemical process used with the tank as disclosed herein.

SUMMARY OF THE INVENTION

In view of the foregoing, it is a primary objective of the subject invention to treat contaminated water and waste water for separating various types of contaminants from the water in a water treatment tank. The tank may include one or more water treatment compartments and made in various sizes and shapes for treating small and large volumes of wastewater. The water treatment tank may be lightweight and portable or made into a stationary installation.

Another object of the subject process is to treat the contaminated water using an electrochemical process wherein suspended and dissolved solids in the water are removed and the treated clean water is decanted from the tank for reuse or discharge.

Still another object of the invention is the contaminants are allowed to stratify in the tank with sludge settling to a bottom of the tank and lighter than water contaminates floating on top of the treated water. The sludge is removed from the bottom of the tank and filtered in filter baskets. The contaminants, floating on top of the treated water, are removed by a vacuum pump and are also filtered using the filter baskets.

Yet another object of the water treatment process is by using an air spray manifold, air bubbles move upwardly in and around electrodes for providing a scrubbing effect and carrying away contaminates that might otherwise gather on the electrodes. This feature greatly improves the efficiency of the treatment process.

A further object of the water treatment tank is through the use of an improved electrode design, the time in changing out each electrode assembly is greatly reduced along with improved maintenance and sealing of the electrode assembly next to the side of the wastewater compartments.

The tank includes a tank housing with first and second wastewater receiving compartments. The two compartments are identical and are used alternately when treating the wastewater. A wastewater inlet line is attached to the top of the first compartment for filling the compartment with wastewater. A side of the first compartment includes an annular opening for receiving an electrode assembly. The electrode assembly includes an annular plastic flange with gasket for providing a watertight seal against an outside of the compartment. Attached to the annular flange is a plurality of electrodes extending inside the compartment for treating the wastewater electrochemically. The electrodes are attached to a power supply via electrode cables with the polarity of a current cycle reversed periodically depending on the types of water contaminates being treated. When the cycle is reversed, the contaminants that gather on the electrodes typically fall to the bottom of the tank as sludge. The sludge is drained into a removable filter basket. Each compartment includes an airline to an air spray manifold disposed under the electrode assembly. The air spray manifold is used for circulating air bubbles upwardly in and around the electrodes for providing a scrubbing effect for carrying away contaminates that might gather on the electrodes. The tank also includes a vacuum pump with a vacuum line for removing the contaminants floating on top of the treated water.

These and other objects of the present invention will become apparent to those familiar with the electrochemical or electrocoagulation treatment of contaminated water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DESCRIPTION OF THE PREFERRED EMBODIMENTS

Figure 1:
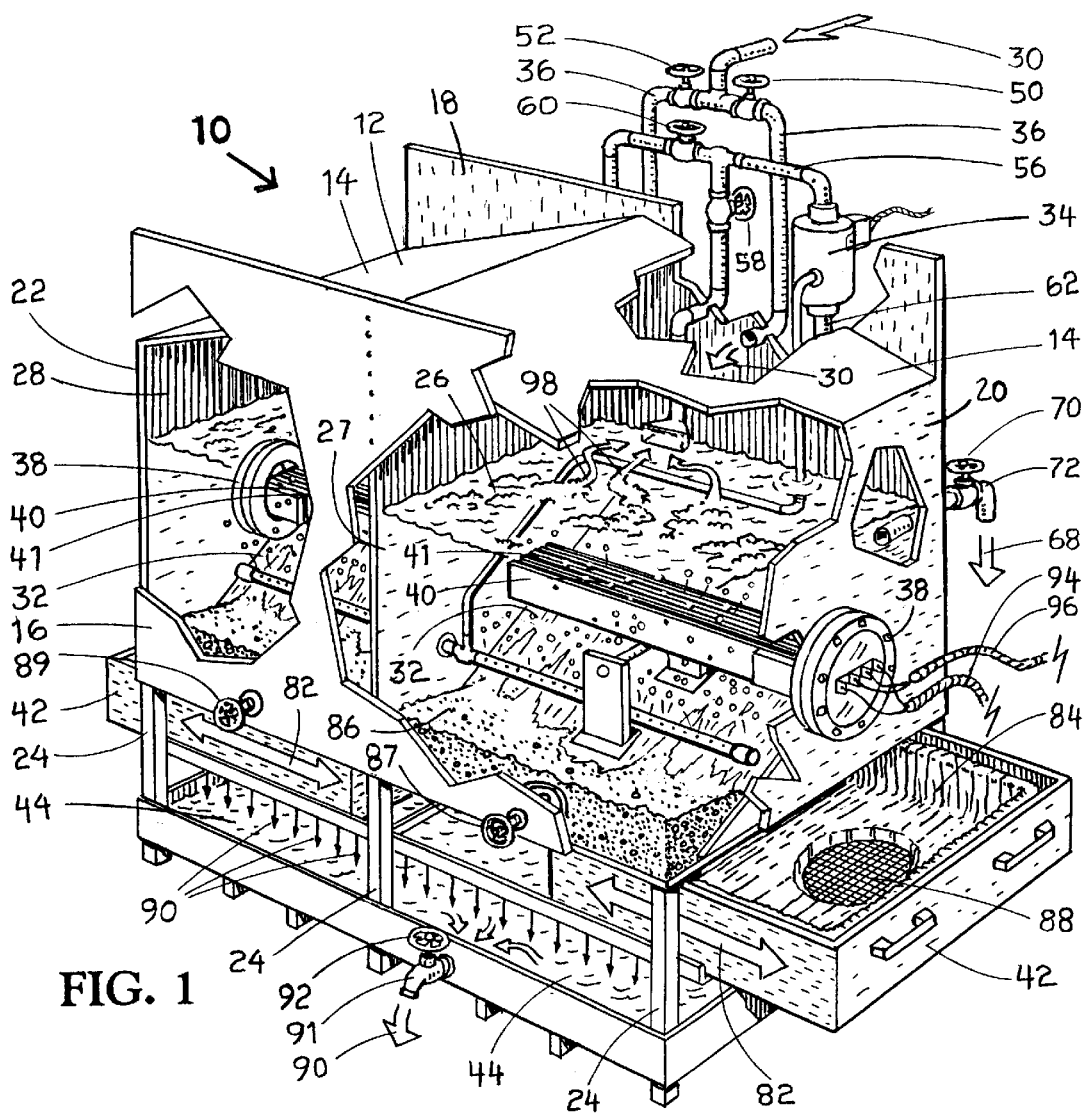
FIG. 1 is a perspective view of a water treatment tank with separate waste water receiving compartments used for treating waste water received from a wastewater collection tank or the like. A portion of the wastewater receiving compartments has been cut-away to expose an improved electrode assembly having a plastic flange electrode mounting plate with positive and negative electrodes received inside the compartments.

In FIG. 1, a perspective view of the subject water treatment tank is illustrated and having general reference numeral 10. The tank 10 includes a tank housing 12 with sloping roof 14, a front 16, a rear 18, a first side 20 and a second side 22, and a housing frame 24. The tank housing 12 is divided into a first wastewater receiving compartment 26 and a second wastewater receiving compartment 28. The two compartments 26 and 28 are identical in size and shape and are used alternately when treating the wastewater. For example, while the first compartment 26 is treating wastewater, the second compartment 28 can be in the process of being filled with wastewater. It should be noted that the tank 10 may hold 55 gallons of waste water, 500 gallons, 1000 gallons and more depending on the amount of waste water generated during a daily operation and required to be cleaned for reuse or discharge.

The first compartment 26, shown in FIG. 1, has been cut away to illustrate wastewater, shown as arrows 30 coming into the compartment 26 and being treated, with the treated water being stratified inside the first compartment 26 prior to removal. Also, a portion of the second compartment 28 has been cut away. There is no waste water 30 shown in the second compartment 28. Both the first and second compartments 26 and 28 include a sloping bottom 32 which slopes downwardly from the rear 18 to the front 20 of the tank housing 12. The compartments 26 and 28 are divided by a common wall 27.

The tank 10 also includes a vacuum pump 34 connected to the compartments 26 and 28, a waste water inlet line 36, a pair of electrode assemblies 38 with positive and negative electrodes 40 and 41, a pair of sliding filter baskets 42 received under the compartment 26 and 28 and a filtrate sump 44 attached to the housing frame 24 and disposed below the filter baskets 42.

Figure 2:
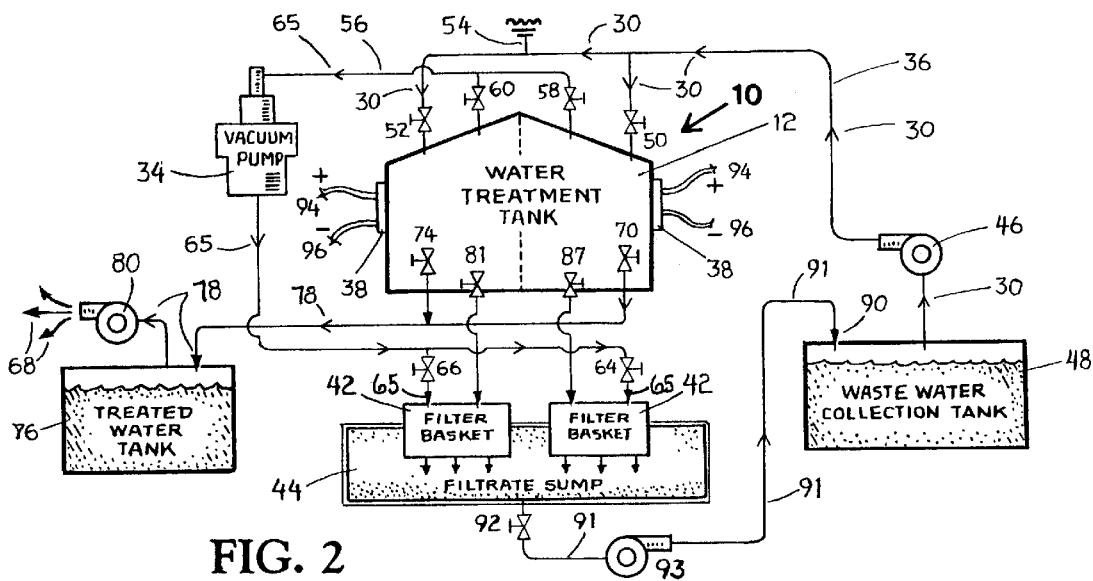
FIG. 2 is a flow diagram illustrating the water treatment tank with vacuum pump, filter baskets and filtrate sump connected to a wastewater collection tank and a treated water tank.

Referring now to the tank 10 shown in FIG. 1 and the flow diagram shown in FIG. 2, the waste water inlet line 36 is shown connected to a waste water pump 46. The waste water pump 46 is connected to a waste water collection tank 48 which is used for holding waste water to be treated. While the waste water collection tank is shown, it can be appreciated that a water pit, lagoon, pond, sump and any other water gathering source can be used equally well for holding contaminated water to be treated by the water treatment tank 10. The inlet line 36 includes a first water inlet valve 50 and a second water inlet valve 52 and a siphon vent 54. Obviously, by opening the first inlet valve 50 and closing the second inlet valve 52, the first compartment 26 can be filled. In turn, by opening the second inlet valve 52 and closing the first inlet valve 50, the second compartment 28 can be filled with waste water 30. Both of the compartments 26 and 28 include a level switch in the top of the compartments for automatically closing the valves 50 and 52 when the compartments are filled with wastewater and the wastewater is ready for treatment. The level switches are not shown in the drawings.

The vacuum pump 34 is connected to the top of the compartments 26 and 28 via a vacuum inlet line 56. The vacuum inlet line 56 is connected to a first vacuum inlet valve 58 which when opened draws a vacuum inside the first compartments 26. The vacuum inlet line 56 is also connected to a second vacuum inlet valve 60 which when opened draws a vacuum inside the second compartment 28. From the vacuum pump 34, a vacuum outlet line 62 is connected to the rear 18 of the tank housing 12 and disposed above the filter baskets 42 for discharging lighter than water contaminates floating on top of the treated water in the compartments 26 and 28. The vacuum outlet line 62 is connected to a first vacuum outlet valve 64 which when opened discharges the vacuumed contaminates, shown as arrows 65, from the first compartment 26 into a first filter basket 42. Also, the vacuum outlet line 62 is connected to a second vacuum outlet valve 66 which when opened discharges the vacuumed contaminates 65 from the second compartment 28 into a second filter basket 42. The vacuum outlet valves 64 and 66 are shown in FIG. 2, but not shown in FIG. 1.

In FIG. 1, treated water shown as arrow 68 is removed from the rear 18 of the tank housing 12 via a first treated water valve 70 connected to the first compartment 26 and out a treated water outlet line 72. The treated water outlet line 72 is also connected to a second treated water valve 74. The second treated water valve 74 is connected to the rear of the second compartment 28. The second treated water valve 74 is not shown in FIG. 1, but can be seen in FIG. 2. The treated water outlet line 72 discharges the treated water into a treated water tank 76 shown in FIG. 2. The treated water 68 can be reused for spray applications, irrigation, etc. using a discharge line 78 and spray pump 80. Also, the treated water 68 can be discharged or reused for a variety of commercial applications.

Referring again to both FIGS. 1 and 2, the two filter baskets 42 are slidably received, as indicated by arrows 82, under the bottom of the first and second compartments 26 and 28. The filter basket 42 on the right is shown partially received under the first compartment 26. The filter baskets 42 each include a filter liner 84 which is used for dewatering sludge 86 which is collected in the bottom of the first and second compartments. The bottom of the filter baskets 42 include a wire mesh screen 88 which is used to allow the filtered water, indicated by arrows 90, to fall from the filter liner 84 and through the screen 88 into the filtrate sump 44.

The filtered water 90 is discharged out the filtrate sump 44 using a filtrate sump valve 92 connected to a filtered water discharge line 91 and a discharge pump 93. The discharge line 91 is connected to the wastewater collection tank 48 where the filtered water 90 is received using the pump 93 and recycled back to the tank 10 for further treating.

In FIG. 1, the waste water 30 in the first compartment 26 is shown being treated electrochemically using the electrode assembly 38. As mentioned above, the electrode assembly 38 includes a plurality of positive electrodes connected to a positive electrode cable 94 which is connected to an outside power source. The outside power source is not shown in the drawings. Also, the plurality of negative electrodes 41, received equally spaced and between the positive electrodes 40, are connected to a negative electrode cable 96 connected to the outside power source.

It should be noted that the preferred power source is direct current, however, other forms of electricity might be employed. The polarity reversing cycle will be dependent on the type of wastewater and the contaminants being treated. The longer the cycle without plugging the electrodes 40 and 41 the better, but reality dictates shorter cycles of 1 to 5 minutes or less to prevent the plating of contaminates on the electrodes 40 and 41.

Also, it should be mentioned, the electrical current between the electrodes 40 and 41 causes a myriad of electrochemical phenomena to occur. For example, colloidal particles are flooded with electrons that cause them to become more dense and electronegative. A positive metallic ion that is sacrificed from the electrodes, becomes an attractive nucleus to the electronegative colloidal particles. This forms a dense precipitate, which then tends to settle to the bottom of the tank compartments. Also, many other electrochemical phenomena can occur due to the general complex components and contaminants found in wastewater.

As the electrical cycle is reversed, the plate scale is expelled form the electrodes and typically the heavy contaminates, in the form of sludge 86, fall to the bottom of the compartment 26 as shown in FIG. 1. The sludge 86 is discharged into the filter baskets 42 using a first sludge discharge valve 87 in the bottom of the first compartment 26 and a second sludge discharge valve 89 in the bottom of the second compartment 28. Note, the sloping bottom 32 of the compartments 26 and 28 aid in feeding the stratified sludge 86 downwardly by gravity prior to the sludge exiting out the sludge discharge valves 87 and 89 and into the filter baskets 42.

Some contaminates in the water treatment process are of less specific gravity than the water being treated and will tend to float to the top surface, as indicated by arrows 98. The lighter than water contaminates 98 are drawn out of the compartment 26 using the vacuum pump 34 and discharged into the filter basket 42. The contaminants 98 are then dewatered using the filter liner 84.

In operation, the first compartment 26 of the tank 10 is filled with wastewater 30 by opening the first inlet valve 50. The waste water pump 46 if then turned "on" and the waste water 30, which has been collected in the waste water collection tank 48, is pumped into the compartment 26. Using a waste water level switch inside the first compartment 26, the pump 46 is turned "off" when the compartment is filled with wastewater 30. At this time, the outside power supply is turned "on" to the electrode cables 94 and 96 and electrical power is supplied to the electrodes 40 and 41 for treating the waste water electrochemically. Depending on the type and amount of contaminants in the wastewater, the water will be treated for 30 minutes to an hour or longer. The power supply is then turned "off" and the treated water is allowed to stratify as shown in FIG. 1. The lighter the water contaminates 98 may be vacuumed off during the water treating operation and after the electrical power is shut down. As mentioned above, while the wastewater 30 is being treated in the first compartment 26, at the same time the second compartment 28 can be filled with wastewater in preparation for water treatment.

When the water has stratified in the first compartment 26, the treated water 68 is decanted out the first compartment by opening the first treated water valve 70. The treated water 68 is discharged into the treated water tank 76 where the water can be reused or discharged. After the treated water 68 is removed, the first sludge discharge valve 87 is opened and the heavy contaminants in the form of sludge 86 are allowed to drain into the filter basket 42. The sludge 86 and the lighter than water contaminants 98 are dewatered using the filter liner 84. The filtered water 90 is allowed to drain into the filtrate sump 44. When the filtrate sump 44 is filled, the filtrate sump valve 92 is opened and the filter water 90 is pumped back to the wastewater collection tank using the discharge line 91 and discharge pump 93.

Figures 3, 4, 5:
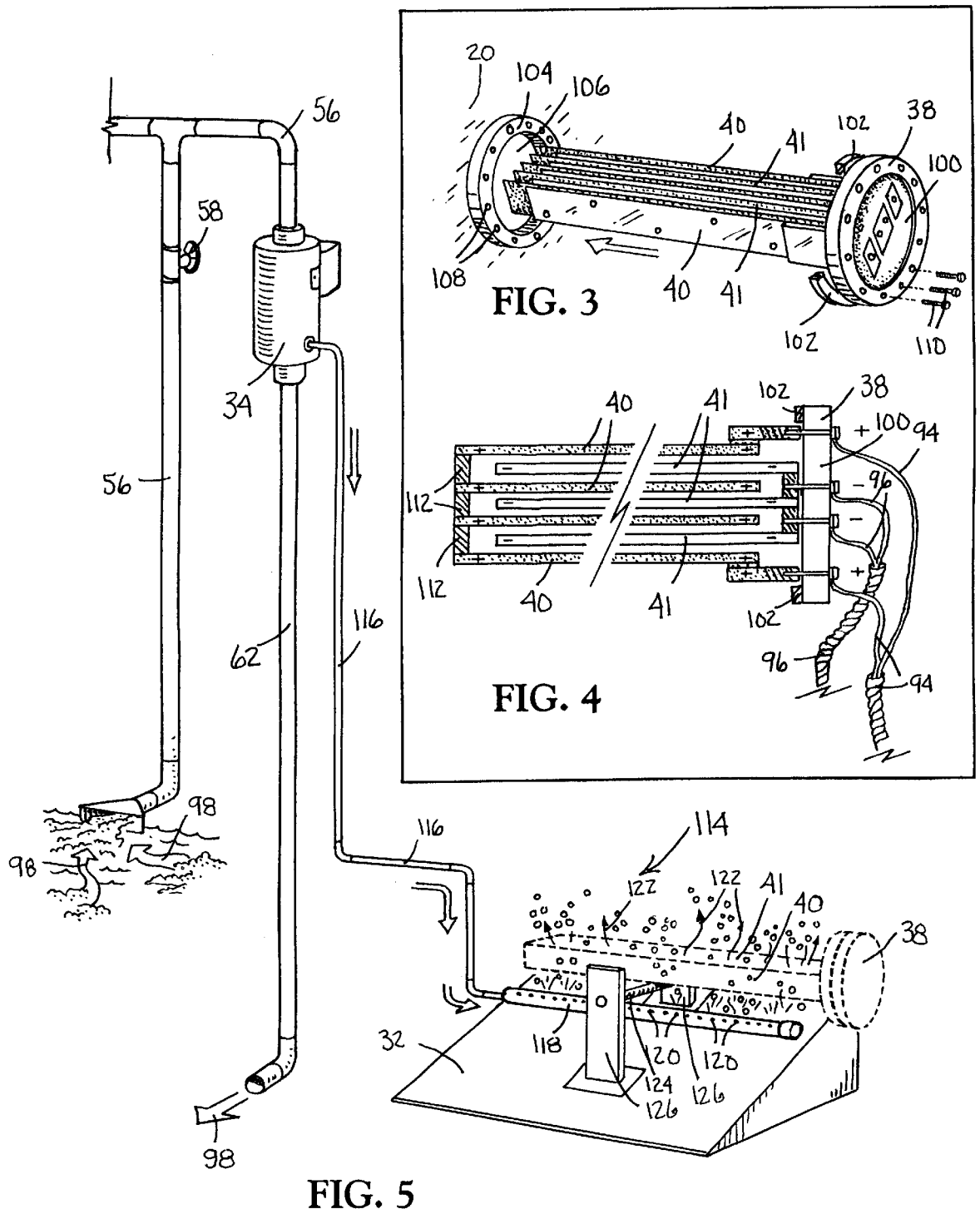
FIG. 3 illustrates a perspective view of one of the improved electrode assemblies positioned for receipt through a hollow plastic tank flange mounting plate attached to a side of the wastewater collection tank.
FIG. 4 is a top view of the electrode assembly shown in FIG. 3.
FIG. 5 is a perspective view illustrating a vacuum system used in the waste water collection compartments wherein an air spray manifold is mounted under the electrode assembly. The air spray manifold circulates air bubbles upwardly and around the electrode assembly for scrubbing contaminates gathered thereon.

In FIG. 3, a perspective view of one of the improved electrode assemblies 38 is shown having an annular shaped non conductive plastic flange electrode mounting plate 100 with an annular seal 102 and an annular shaped non conductive hollow plastic flange tank mounting plate 104. A portion of the annular seal 102 in this drawing has been cut away. The flange electrode mounting plate 100 is attached at one end of a plurality of the positive and negative electrodes 40 and 41. The flange tank mounting plate 104 is attached to the side of an annular opening in the side 20 of the first compartment 26. The flange tank mounting plate 104 includes an opening 106 for receiving the electrodes 40 and 41 therethrough. The two mounting plates 100 and 104 include a plurality of bolt holes 108 for receiving bolts 110 when securing the electrode mounting plate 100 to the side of the tank mounting plate 104 with the annular seal 102 mounted therebetween to prevent leakage of the waste water from the two compartments.

In FIG. 4, a top view of the electrode assembly 38 is shown. In this view, the positive electrodes 40 are shown connected to the positive electrode cable 94 and the negative electrodes 41 connected to the negative electrode cable 96. In this drawing, aluminum spacers 112 are shown for keeping the positive electrodes 40 in a spaced apart relationship from the negative electrodes 41.

In FIG. 5, a perspective view illustrating a waste water compartment air spray system mounted inside the waste water collection compartments 26 and 28 is shown. The air spray system is shown having general reference numeral 114. The air spray system 114 includes an airline 116 attached to the vacuum pump 34 for tapping a portion of the air directed through the vacuum outlet line 62. The airline 116 is connected to one end of an air spray manifold 118 having a plurality of air holes 120 for circulating air upwardly, as indicated by arrows 122. The air spray manifold 118 is disposed underneath and along the length of the positive and negative electrodes 40 and 41. The air spray manifold 118 is used to circulate air bubbles upwardly and around the electrode assembly 38 for scrubbing contaminates gathered thereon on the electrodes thereby greatly improving the efficiency of the waste water treatment process.

The air spray system 114 also includes an electrode insulated support bar 124 having ends mounted on top of a pair of insulated support posts 126 mounted on the sloping bottom 32 of the two compartments. Because of the weight of the electrodes 40 and 41, the electrodes are received on top of the insulated support bar 124 to prevent stress occurring on the electrode mounting plate 100. Also, the insulated support bar 124 is used to hold the electrodes above the air spray manifold for making sure the air spray is able to circulate in and around the positive and negative electrodes 40 and 41.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A water treatment tank for treating waste water using an electrochemical treatment process, the electrochemical process removing both suspended and dissolved solids and contaminates in the waste water and allowing treated water to be removed from the tank while heavy contaminates settle to the bottom of the tank as sludge and are removed and lighter than water contaminates are removed by vacuum from the top of the tank, the tank comprising:

a tank housing, said tank housing including a waste water receiving compartment, said compartment having sides, a top and a bottom, said compartment adapted for receiving waste water to be treated therein, one of the compartment sides having an annular opening therein for receiving a non-conductive annular hollow flange tank mounting plate attached to the side of the annular opening;

a vacuum pump with a vacuum inlet line connected to said compartment, said vacuum pump adapted for drawing a vacuum inside said compartment and removing lighter than water contaminates;

means for removing treated water from said compartment and attached thereto;

an electrode assembly having a non-conductive annular flange electrode mounting plate attached to one end of a plurality of spaced apart positive and negative electrodes, said electrodes extending through said hollow flange tank mounting plate and inside said compartment for treating the waste water electrochemically when electrical power is applied to said electrodes, said electrode mounting plate removably attached to said tank mounting plate; and means for collecting sludge received in the bottom of said compartment, said means for collecting sludge disposed below the bottom of said compartment.

2. The tank as described in claim 1 further including an air spray system connected to said vacuum pump and disposed underneath said electrodes for circulating air bubbles upwardly and around said electrode assembly for scrubbing contaminates gathered on said positive and negative electrodes.

3. The tank as described in claim 2 wherein said air spray system includes an air line, said air line having one end attached to said vacuum pump and an opposite end attached to an air spray manifold, said air spray manifold disposed underneath said positive and negative electrodes.

4. The tank as described in claim 1 wherein said positive and negative electrodes are attached to electrode cables for receiving direct current, said electrode cables adapted for attachment to a direct current power supply.

5. The tank as described in claim 1 wherein said means for collecting sludge is a filter basket.

6. The tank as described in claim 5 further including a filtrate sump mounted in a bottom of said compartment, said filtrate sump disposed below said filter basket and adapted for receiving water from said filter basket.

7. The tank as described in claim 1 wherein said means for removing treated water is a treated water outlet line attached to said compartment, said treated water outlet line connected to a treated water valve for opening and closing said outlet line.

8. A water treatment tank for treating wastewater using an electrochemical treatment process, the electrochemical process removing both suspended and dissolved solids and contaminates in the waste water and allowing treated water to be removed from the tank while heavy contaminates settle to the bottom of the tank as sludge and are removed and lighter than water contaminates are removed by vacuum from the top of the tank, the tank comprising:

a tank housing, said tank housing including a waste water receiving compartment, said compartment having sides, a top and a bottom, said compartment adapted for receiving waste water to be treated therein;

a vacuum pump with a vacuum inlet line connected to said compartment, said vacuum pump adapted for drawing a vacuum inside said compartment and removing lighter than water contaminates;

means for removing treated water from said compartment and attached thereto;

an electrode assembly having spaced apart positive and negative electrodes, said electrodes extending through a side of said compartment for treating the waste water electrochemically when electrical power is applied to said electrodes, said flange electrode mounting plate removably attached to said tank mounting plate;

means for collecting sludge received in the bottom of said first compartment, said means for collecting sludge disposed below the bottom of said compartment; and an air spray system connected to said vacuum pump and disposed underneath said electrodes for circulating air bubbles upwardly and around said electrode assembly for scrubbing contaminates gathered on said positive and negative electrodes.

9. The tank as described in claim 8 wherein said air spray system includes an air line, said air line having one end attached to said vacuum pump and an opposite end attached to an air spray manifold, said air spray manifold disposed underneath said positive and negative electrodes for spraying air upwardly around said electrodes.

10. The tank as described in claim 9 further including an electrode insulated support bar mounted above the bottom of said compartment and disposed under said positive and negative electrodes for supporting said electrodes thereon.

11. The tank as described in claim 8 wherein said positive and negative electrodes are attached to electrode cables for receiving direct current, said electrode cables adapted for attachment to a direct current power supply.

12. The tank as described in claim 8 wherein said means for collecting sludge is a filter basket with a filter liner therein.

13. The tank as described in claim 12 further including a filtrate sump mounted in a bottom of said compartment, said filtrate sump disposed below said filter basket and adapted for receiving water filtered through said filter liner in said filter basket.

14. A water treatment tank for treating waste water using an electrochemical treatment process, the electrochemical process removing both suspended and dissolved solids and contaminates in the waste water and allowing treated water to be removed from the tank while heavy contaminates settle to the bottom of the tank as sludge and are removed and lighter than water contaminates are removed by vacuum from the top of the tank, the tank comprising:

a tank housing, said tank housing including a waste water receiving compartment, said compartment having sides, a top and a bottom, said compartment adapted for receiving waste water to be treated therein, one of the compartment sides having an annular opening therein for receiving a non-conductive annular hollow flange tank mounting plate attached to the side of the annular opening;

a vacuum pump with a vacuum inlet line connected to said compartment, said vacuum pump adapted for drawing a vacuum inside said compartment and removing lighter than water contaminates;

means for removing treated water from said compartment and attached thereto;

an electrode assembly having a non-conductive annular flange electrode mounting plate attached to one end of a plurality of spaced apart positive and negative electrodes, said electrodes extending through said hollow flange tank mounting plate and inside said compartment for treating the waste water electrochemically when electrical power is applied to said electrodes, said flange electrode mounting plate removably attached to said tank mounting plate;

means for collecting sludge received in the bottom of said first compartment, said means for collecting sludge disposed below the bottom of said compartment; and an air spray system connected to said vacuum pump and disposed underneath said electrodes for circulating air bubbles upwardly and around said electrodes for scrubbing contaminates gathered on said positive and negative electrodes.

15. The tank as described in claim 14 wherein said air spray system includes an air line, said air line having one end attached to said vacuum pump and an opposite end attached to an air spray manifold, said air spray manifold disposed underneath said positive and negative electrodes for spraying air upwardly around said electrodes.

16. The tank as described in claim 14 further including an electrode insulated support bar mounted above the bottom of said compartment and disposed under said positive and negative electrodes for supporting said electrodes thereon.

17. The tank as described in claim 14 wherein said positive and negative electrodes are attached to electrode cables for receiving direct current, said electrode cables adapted for attachment to a direct current power supply.

* * * * *